United States Patent [19]

Ito et al.

[11] 4,418,780
[45] Dec. 6, 1983

[54] METHOD OF STEERING A WHEELED VEHICLE HAVING AT LEAST TWO PAIRS OF STEERABLE ROAD WHEELS

[75] Inventors: Hideo Ito, Zushi; Keiichiro Yabuta, Yokohama, both of Japan

[73] Assignee: Nissan Motor Company, Limited, Yokohama, Japan

[21] Appl. No.: 273,971

[22] Filed: Jun. 15, 1981

[30] Foreign Application Priority Data

Jun. 24, 1980 [JP] Japan .................................. 55-84519

[51] Int. Cl.³ .............................................. B62D 5/04
[52] U.S. Cl. ..................................... 180/142; 180/79.1
[58] Field of Search ...................... 180/79.1, 140, 141, 180/142

[56] References Cited

U.S. PATENT DOCUMENTS

| | | | |
|---|---|---|---|
| 3,387,684 | 6/1968 | Belke et al. | 180/79.1 |
| 3,455,408 | 7/1969 | Larsen | 180/79.1 |
| 3,897,846 | 8/1975 | Inoue | 180/142 |
| 3,933,215 | 1/1976 | Scheverle | 180/140 |
| 4,105,086 | 8/1978 | Ishii et al. | 180/143 |
| 4,175,638 | 11/1979 | Christensen | 180/140 |
| 4,263,979 | 4/1981 | Sturgill | 180/79.1 |
| 4,335,800 | 6/1982 | Arato | 180/140 |

FOREIGN PATENT DOCUMENTS

| | | | |
|---|---|---|---|
| 2083422 | 3/1982 | United Kingdom | 180/141 |
| 734049 | 5/1980 | U.S.S.R. | 180/140 |

Primary Examiner—Joseph F. Peters, Jr.
Assistant Examiner—Ross Weaver
Attorney, Agent, or Firm—Lane, Aitken & Kananen

[57] ABSTRACT

A method of steering a wheeled vehicle having a first pair of steerable road wheels to be steered by human intervention and a second pair of steerable road wheels to be steered in response to a steering effort applied to the first pair of steerable road wheels, wherein the ratio between the angle through which the first pair of steerable road wheels is steered and the angle through which the second pair of steerable road wheels is to be steered is varied to establish a predetermined functional relationship between the ratio and a detected vehicle speed so as to eliminate the lateral slip of the vehicle when the vehicle is making a turn.

2 Claims, 4 Drawing Figures

METHOD OF STEERING A WHEELED VEHICLE HAVING AT LEAST TWO PAIRS OF STEERABLE ROAD WHEELS

FIELD OF THE INVENTION

The present invention relates to a method of steering a wheeled vehicle of the type having a pair of steerable road wheels to be steered by human intervention and a pair of steerable road wheels to be automatically steered in response to a steering effort applied to the former road wheels.

BACKGROUND OF THE INVENTION

In ordinary automotive vehicles, only the front road wheels or the rear road wheels are steerable. Some vehicles such as those having exceptionally elongated wheel bases are two or more pairs of steerable road wheels. These pairs of steerable road wheels are coupled together either mechanically or through hydraulic circuits. One pair of steerable road wheels is steered by human intervention and another pair of steerable road wheels is steered through an angle proportional to the angle through which the former pair of road wheels is steered. A vehicle having such pairs of steerable road wheels is capable of being steered to make a sharp turn at a low speed where an ample space is not available for the turning movement of the vehicle.

When a vehicle of this type is making a turn, the vehicle is subject to not only yawing motion but also to lateral slip about a vertical axis which passes through the center of gravity of the vehicle. Due to the lateral slip thus involved in a turning motion of the vehicle, the vehicle is not capable of travelling in a direction tangential to the turning circle so that the vehicle driver is not enabled to have a correct control over the direction in which the vehicle is to advance.

Since, furthermore, the lateral acceleration of the vehicle as sensed by the vehicle driver is not in conformity to the acceleration of the centrifugal force acting on the vehicle making a turn, the vehicle driver is compelled to maneuver the vehicle with a strained sensation.

The present invention contemplates elimination of these drawbacks thus far encountered in a vehicle using two or more pairs of steerable road wheels.

SUMMARY OF THE INVENTION

In accordance with the present invention, there is proposed a method of steering a wheeled vehicle having a first pair of steerable road wheels to be steered by human intervention and a second pair of steerable road wheels to be steered in response to a steering effort applied to the first pair of steerable road wheels, wherein the second pair of steerable road wheels is steered through an angle proportioned at a ratio k to the angle through which the first pair of steerable road wheels is steered and wherein the ratio k is given by $$(A - B \cdot V^2)/(C - D \cdot V^2),$$

wherein V is a detected vehicle speed and A, B, C and D are predetermined parameters. The parameter B may be substituted by $B' \cdot M$ or the parameters B and D may be substituted by $B' \cdot M$ and $D' \cdot M$, respectively, wherein $B'$ and $D'$ are predetermined constants and M is variable with the total weight or the total sprung mass of the vehicle.

BRIEF DESCRIPTION OF THE DRAWINGS

The features and advantages of a method according to the present invention will be more clearly appreciated from the following description taken in conjunction with the accompanying drawings, in which.

DETAILED DESCRIPTION OF THE INVENTION

Figure 1:
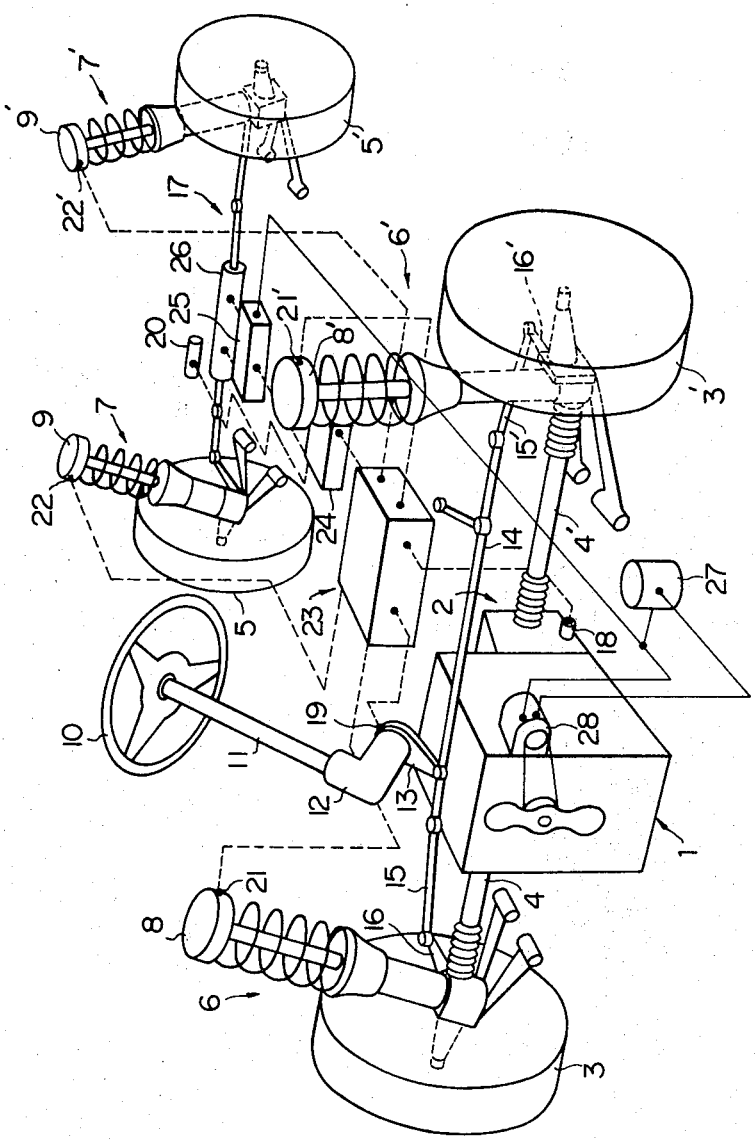
FIG. 1 is a schematic perspective view showing various operating systems of an automotive vehicle in which a method according to the present invention is put into practice.

In FIG. 1 of the drawings, various operating systems of an automotive vehicle having steerable front and rear road wheels are shown. These systems include a power plant 1, a power transmission system 2 and steering and suspension systems. The power plant 1 may be constituted by an automotive internal combustion engine. The power transmission system 2 is herein assumed by way of example as being of the transaxle type forming part of a front-engine front-drive power train and is operative to transmit driving power from the power plant 1 to front road wheels 3 and 3' through drive shafts 4 and 4', respectively, at a controlled or selected gear ratio.

The suspension system is adapted to have the front road wheels 3 and 3' and rear road wheels 5 and 5' suspended from the frame structure of the vehicle body and comprises front suspension units 6 and 6' and rear suspension units 7 and 7'. The front suspension units 6 and 6' are shown as being of the strut type by way of example and are connected each at one end to the wheel-spindle assemblies of the front road wheels 3 and 3', respectively, and at the other ends to the frame structure (not shown) of the vehicle body by means of suitable connecting members 8 and 8' secured to the frame structure. The rear suspension units 7 and 7' are also assumed to be of the strut type and are connected each at one end to the wheel-spindle assemblies of the rear road wheels 5 and 5', respectively, and at the other ends to the frame structure of the vehicle body by means of connecting members 9 and 9' secured to the frame structure.

On the other hand, the steering system is constructed and arranged to be capable of steering not only the front road wheels 3 and 3' but also the rear road wheels 5 and 5'. The steering system is shown comprising a steering wheel 10, a steering shaft 11 extending axially from and rotatable with the steering wheel 10, and a steering gear mechanism 12 adapted to translate the rotary motion of the steering shaft 11 into corresponding lateral movement. The lateral movement produced by the steering mechanism 12 is transmitted through a Pitman arm 13 to a front-wheel steering linkage connected to the wheel-spindle assemblies of the front road wheels 3 and 3'. In the arrangement illustrated in FIG. 1, such a steering linkage is shown by way of example as comprising a connecting rod 14, a pair of lateral tie rods 15 and 15', and a pair of knuckle arms 16 and 16'. The Pitman arm 13 is pivotally connected to the connecting rod 14 which in turn is pivotally connected at the opposite ends thereof to the lateral tie rods 15 and 15'. The tie rods 15 and 15' in turn are pivotally connected at their respective outer ends to the knuckle arms 16 and 16' connected to the wheel-spindle assemblies of the front road wheels 3 and 3', respectively.

The steering system of the vehicle arrangement shown in FIG. 1 further comprises a rear-wheel steering linkage 17 for steering the rear road wheels 5 and 5' at angles related to the angles at which the front road wheels are to be steered. The mechanical construction of such a linkage 17 may be essentially similar to the above described construction of the front-wheel steering linkage.

To carry out the method according to the present invention, the systems of the vehicle shown in FIG. 1 are provided with a vehicle-speed sensor 18, a front steering-angle sensor 19, a rear steering-angle sensor 20, front sprung-mass sensors 21 and 21', and rear sprung-mass sensors 22 and 22'. The vehicle-speed sensor 18 is adapted to detect the running speed of the vehicle and is shown arranged in conjunction with the power transmission system 2 by way of example. The front steering-angle sensor 19 is adapted to detect the angle through which the front road wheels 3 and 3' are being steered and is shown provided in conjunction with the steering gear mechanism 12 by way of example. The rear steering-angle sensor 20 is operative to detect the angle through which the rear road wheels 5 and 5' are to be steered in accordance with the present invention. The front sprung-mass sensors 21 and 21' are adapted to detect the sprung masses of the vehicle borne by the front road wheels 3 and 3' through the front suspension units 6 and 6' and are shown provided in conjunction with the connecting members 8 and 8' of the suspension units 6 and 6', respectively, by way of example. Likewise, the rear sprung-mass sensors 22 and 22' are adapted to detect the sprung masses of the vehicle borne by the rear road wheels 5 and 5' through the rear suspension units 7 and 7' and are shown provided in conjunction with the connecting members 9 and 9' of the suspension units 7 and 7', respectively, by way of example.

Thus, the vehicle-speed sensor 18 is operative to produce an output signal indicative of the detected running speed of the vehicle. The front steering-angle sensor 19 is operative to produce an output signal indicative of the detected angle through which the front road wheels 3 and 3' are steered and, likewise, the rear steering-angle sensor 20 is operative to produce an output signal indicative of the detected angle through which the rear road wheels 5 and 5' are steered. On the other hand, the front sprung-mass sensors 21 and 21' are operative to produce output signals indicative of the detected sprung masses carried by the front road wheels 3 and 3', respectively, and the rear sprung-mass sensors 22 and 22' are operative to produce output signals indicative of the detected sprung masses carried by the rear road wheels 5 and 5'. The rear steering-angle sensor 20 may be constituted by a linear potentiometer having a movable contact element connected to or engaged by a suitable movable member of the rear-wheel steering linkage 17.

Figure 2:
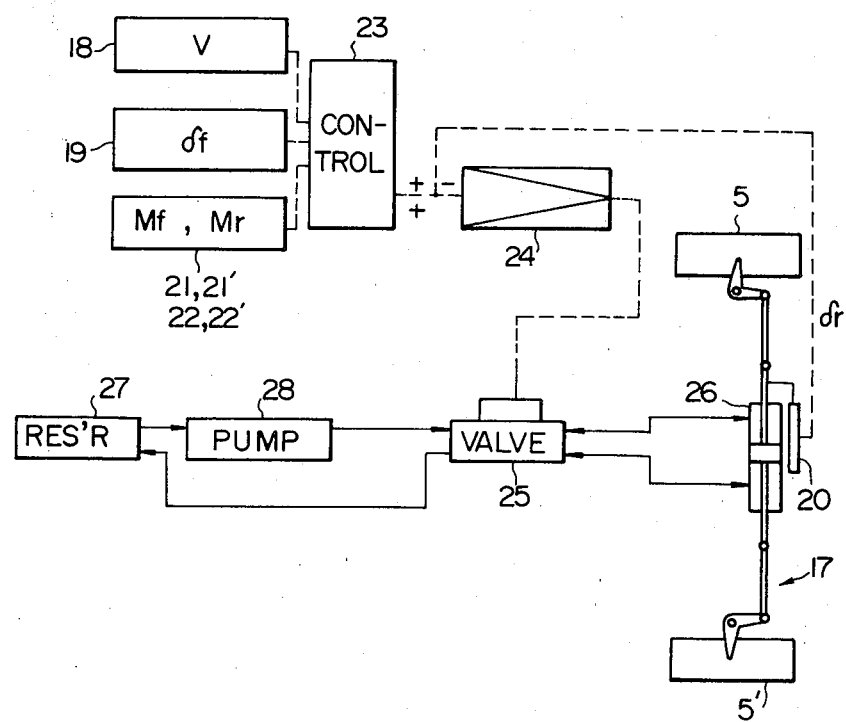
FIG. 2 is a block diagram showing electric and hydraulic control systems included in the arrangement illustrated in FIG. 1.

The signals thus produced by the sensors 18, 19, 21, 21', 22 and 22', viz., the sensors except for the rear steering-angle sensor 20 are fed to an electric control unit 23 having an output terminal connected through a servo amplifier 24 to an electromagnetically-operated servo valve 25 as will be also seen from FIG. 2 of the drawings. The signal produced by the rear steering-angle sensor 20 is fed through the servo amplifier 24 to the servo valve 25 as a feedback signal. The servo valve 25 forms part of a hydraulic drive system for a fluid-operated linkage actuator 26 for the rear steering linkage 17 and the hydraulic drive system further comprises a fluid reservoir 27 and a fluid pump 28. The fluid pump 28 has a fluid inlet end communicating with the fluid reservoir 27 and a discharge end communicable through the servo valve 25 with the linkage actuator 26. The fluid pump 28 thus arranged is driven by, for example, the internal combustion engine constituting the power plant 1 for being operative to deliver a hydraulic fluid from the discharge end thereof when the engine is in operation. The linkage actuator 26 is constituted by a double-acting power cylinder including a piston secured to any movable member of the rear-wheel steering linkage 17 and a stationary cylinder body fixed to, for example, the frame structure of the vehicle body and having the piston slidably received therein, as will be seen from FIG. 2. Thus the servo valve 25 is adapted to provide communication selectively from the fluid pump 28 to one or both of the two pressure acting chambers thus formed in the cylinder body of the linkage actuator 26 or from one or both of these pressure acting chambers to the fluid reservoir 27. The fluid delivered from the fluid pump 28 is thus selectively supplied to and discharged from the two pressure acting chambers of the linkage actuator 26 back to the fluid reservoir 27 depending upon the signals supplied from the servo amplifier 24 to the servo valve 25. This causes the piston of the linkage actuator 26 to axially move with respect to the stationary cylinder body of the actuator 26. The movement of the piston with respect to the cylinder body of the linkage actuator 26 is transmitted through the rear-wheel steering linkage 17 to the rear road wheels 5 and 5', which are thus directed with respect to the vehicle body at an angle variable with the amount of displacement of the piston with respect to the cylinder body.

Analysis will be hereinafter made in respect of the sidewise slip of a vehicle making a turn on a level surface. For simplicity of analysis, it will be assumed that the rolling angle of the vehicle turning is negligible and that the sprung weights exerted on the front and rear road wheels 3 and 5 are respectively equal to the sprung weights on the front and rear road wheels 3' and 5'. The vehicle under consideration can thus be modelled as a two-wheeled vehicle having two degrees of freedom involving a yawing motion about a vertical axis and a sidewise slipping motion away from the axis of the turning motion of the vehicle.

Figure 3:
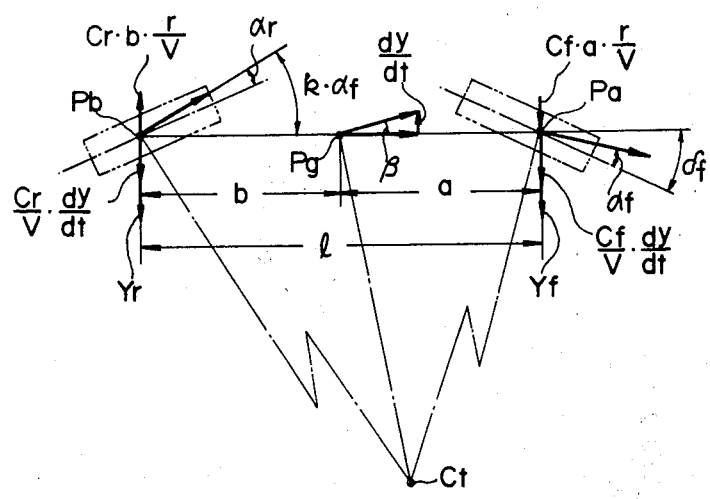
FIG. 3 is a diagram showing the relationships among various parameters of a wheeled vehicle representative of the vehicle including the arrangement illustrated in FIG. 1.

FIG. 3 of the drawings show various parameters of such a two-wheeled vehicle, wherein M: the total sprung mass of the vehicle;
V: the vehicle speed;
l: the wheel base of the vehicle;
Pa: the center axis of the front wheel axle;
Pb: the center axis of the rear wheel axle;
Pg: the center of gravity of the vehicle;

a: the distance between the center axis of the front wheel axle Pa and the center of gravity Pg of the vehicle;

b: the distance between the center axis of the rear wheel axle Pb and the center of gravity Pg of the vehicle;

Ct: the center of rotation of the vehicle turning;

Cf: the cornering power of the front wheel tire;

Cr: the cornering power of the rear wheel tire;

Yf: the cornering force of the front road wheel;

Yr: the cornering force of the rear road wheel;

$\gamma$: the yawing rate of the vehicle;

y: the lateral displacement of the center of gravity Pg of the vehicle;

$\alpha f$: the slip angle of the front road wheel with respect to the fore-and-aft direction of the vehicle;

$\alpha r$: the slip angle of the rear road wheel with respect to the fore-and-aft direction of the vehicle;

$\beta$: the lateral slip angle of the vehicle at the center of gravity Pg with respect to the fore-and-aft direction of the vehicle; and $\delta f$: the front-wheel steering angle through which the front road wheel is steered.

Assuming, now, that the rear road wheel of the vehicle under consideration is being steered through the angle which is k times the steered angle $\delta f$ through which the front road wheel is steered, the following equations of motion hold in respect to the vehicle:

$$\begin{cases} M\left(\dfrac{d^2y}{dt^2} + V \cdot \gamma\right) = Yf + Yr, \text{ and} \\ I_z \cdot \dfrac{d\gamma}{dt} = a \cdot Yf - b \cdot Yr, \end{cases} \quad \text{Eqs. 1}$$

where $I_z$ is the angular moment of inertia of the vehicle which is yawing about a fixed vertical axis at the rate $\gamma$ and where $$Yf = -Cf \cdot \alpha f = -Cf\left(\dfrac{dy}{dt}/V + \dfrac{a \cdot \gamma}{V} - \delta f\right), \text{ and}$$

$$Yr = -Cr \cdot \alpha r = -Cr\left(\dfrac{dy}{dt}/V - \dfrac{b \cdot \gamma}{V} + k \cdot \delta f\right).$$

If, in this instance, it is assumed that the vehicle is making a turn at a constant velocity, then $d^2y/dt^2=0$ and $d\gamma/dt=0$ so that Equations 1 are re-written as $$\begin{cases} M \cdot V \cdot \gamma = Yf + Yr \\ a \cdot Yf = b \cdot Yr \end{cases} \quad \text{Eqs. 1'}$$

Solution of these equations for the lateral slip angle gives, in consideration of the relation $\beta = dy/dt/V$ $$\beta = \dfrac{l(b - a \cdot k)/V^2 - M(a/Cr + b \cdot k/Cf)}{l^2/V^2 - M(a/Cr - b/Cf)} \, \delta$$

In order to eliminate the lateral slip angle $\beta$ as contemplated in the present invention, therefore, it is necessary that the following relationship holds:

$$l(b-a \cdot k)/V^2 - M(a/Cr + b \cdot k/Cf) = 0$$

When this relationship is established, the rear/front steering-angle ratio k of the angle through which the rear road wheel is to be steered versus the angle $\delta f$ through which the front road wheel is steered is given by $$k = \dfrac{b \cdot l - M \cdot V^2(a/Cr)}{a \cdot l + M \cdot V^2(b/Cf)}. \quad \text{Eq. 2}$$

It is thus seen that the lateral slip angle $\beta$ of the vehicle making a turn can be reduced to zero when the rear road wheel is steered through the angle determined by the ratio k given by Equation 2. The angle through which the rear road wheel is to be steered is, when denoted as $\delta r$, expressed as $$\delta r = k \cdot \delta f. \quad \text{Eq. 3}$$

From Equations 2 and 3 above, it is seen that the rear/front steering-angle ratio k and accordingly the angle $\delta r$ through which the rear road wheel is to be steered is determined when the vehicle speed V, the total sprung mass M of the vehicle, the front-wheel steering angle $\delta f$ and the distances a and b between the center of gravity Pg of the vehicle and the center axes Pa and Pb of the front and rear wheel axles, respectively, are known. The sprung mass M of the vehicle in particular varies with the tare weight of the vehicle, the amount of load carried by the vehicle, the distance a between the center of gravity Pg and the center axis Pa of the front wheel axle and the distance b between the center of gravity Pg and the center axis Pb of the rear wheel axle. The changes in the total sprung mass M of the vehicle are, however, practically negligible as compared to the changes in the vehicle speed V and the front-wheel steering angle $\delta f$. For this reason, the total sprung mass M of the vehicle can be deemed as practically fixed for a vehicle of a make and can accordingly be predetermined as a fixed value which is proper to the vehicle.

Figure 4:
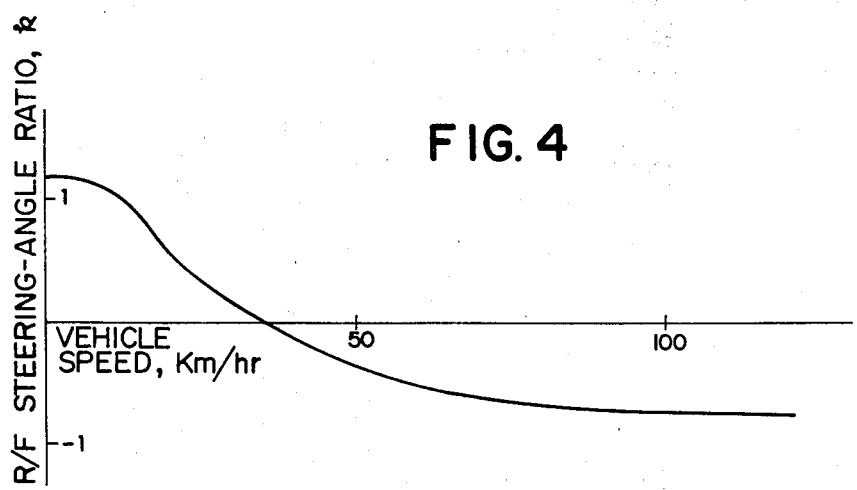
FIG. 4 is a graph showing a preferred example of the functional relationship between the vehicle speed and the rear/front steering-angle ratio to be obtained in a method according to the present invention.

When the total sprung mass M of the vehicle is thus given as a predetermined value, the lateral slip angle $\beta$ of the vehicle shown in modelled form in FIG. 3 can be eliminated if the ratio k between the front-wheel and rear-wheel steering angles $\delta f$ and $\delta r$ is varied with the vehicle speed V with a predetermined functional relationship established therebetween as, for example, indicated by curve F in FIG. 4 of the drawings.

In the arrangement illustrated in FIG. 1 of the drawings, the vehicle speed V is detected by the vehicle-speed sensor 18 and the front-wheel steering angle $\delta f$ is detected by the front steering-angle sensor 19. On the other hand, the distance a between the center of gravity Pg and the center axis Pa of the front wheel axle is determined on the basis of each of the sprung masses of the vehicle which are carried by the front road wheels 3 and 3' and which are detected by the front sprung-mass sensors 21 and 21', respectively. Likewise, the distance b between the center of gravity Pg and the center axis of the rear wheel axle is determined on the basis of each of the sprung masses of the vehicle which are carried by the rear road wheels 5 and 5' and which are detected by the rear sprung-mass sensors 22 and 22', respectively. If, in this instance, each of the sprung masses detected by the front sprung-mass sensors 21 and 21' is denoted as Mf and each of the spring masses detected by the rear sprung-mass sensors 22 and 22' is denoted as Mr, then the distances a and b are expressed in terms of the sprung masses Mf and Mr as $$a = l \times Mr/M \text{ and } b = l \times Mf/M. \qquad \text{Eqs. 4}$$

The control unit 23 in the arrangement shown in FIGS. 1 and 2 of the drawings has preliminarily registered therein the respective values of the total sprung mass M and the wheel base l of the vehicle. The distances a and b are thus calculated in the control unit 23 in accordance with Equations 4 above on the basis of the sprung mass Mf represented by each of the signals from the front sprung-mass sensors 21 and 21' and the sprung mass Mr represented by each of the signals from the rear sprung-mass sensors 22 and 22'. The control unit 23 has further registered therein the values of the cornering powers Cf and Cr of the front and rear wheel tires and is operative to calculate the rear/front steering-angle ratio k in accordance with Equation 2 on the basis of the distances a and b thus calculated as well as the vehicle speed V represented by the signal from the vehicle speed sensor 18. If desired, the control unit 23 may be otherwise designed to be operative in such a manner as to calculate the rear/front steering-angle ratio k on the basis of the distances a and b and a suitable fixed parameter.

The rear/front steering-angle ratio k thus calculated is multiplied by the front-wheel steering angle δf represented by the signal supplied from the front steering angle sensor 19 to the control unit 23. In this fashion, the control unit 23 produces an output signal representative of the product of the calculated rear/front steering-angle ratio k and the detected front-wheel steering angle δf and accordingly the angle δr through which each of the rear road wheels 5 and 5' is to be steered. The signal thus supplied from the control unit 23 is compared with the signal from the rear steering-angle sensor 20 and is corrected if there is an error between the desired rear-wheel stering angle δr and the detected rear-wheel steering angle represented by the single from the sensor 20.

When it is assumed that $b \cdot l = A$, $M(a/Cr) = B$, $a \cdot l = C$ and $M(b/Cf) = -D$, Equation 2 can be re-written in the form $$k = (A - B \cdot V^2)/(C - D \cdot V^2). \qquad \text{Eq. 2'}$$

The parameters A, B, C and D may be calculated from the values of M, l, a, b, Cr and Cf. In accordance with the present invention, however, it is proposed that the parameters A, B, C and D be experimentally predetermined in such a manner that the functional relationship represented by the curve F shown in FIG. 4 is established between the ratio k and the vehicle speed V. If, on the other hand, the total sprung mass M of the vehicle is variable to an appreciable degree and if, for this reason, it is desired to take the changes in the sprung mass M into account, the parameters B and D in Equation 2' may be substituted by B'·M and D'·M, respectively, where B' and D' are predetermined constants. In this instance, Equation 2' is further re-written as $$k = (A - B' \cdot M \cdot V^2)/(C - D' \cdot M \cdot V^2), \qquad \text{Eq. 2''}$$

when the parameters A, B, C and D or the parameters A, B', C and D' are thus predetermined experimentally, the front sprung-mass sensors 21 and 21' and the rear sprung-mass sensors 22 and 22' in the arrangement shown in FIGS. 1 and 2 can be dispensed with. While the parameter M has been assumed to be representative of the detected total sprung mass of the vehicle, any variable may be used as such a parameter insofar as the variable is variable with the total weight of the vehicle.

In the case of a truck or any other cargo handling vehicle having a load capacity which is large as compared to the tare weight of the vehicle, it is preferable that the rear/front steering-angle ratio k be determined in accordance with Equation 2" so as to take into account the variation in the total sprung mass M of the vehicle. For this purpose, the arrangement illustrated in FIGS. 1 and 2 of the drawings further comprises a sprung-mass senspor (not shown) operative to detect the total sprung mass M of the vehicle and to produce an output signal representative of the detected sprung mass M of the vehicle. In lieu of such a sprung-mass sensor, a sensor may be used which is adapted to detect the amount of load carried on a vehicle and to produce an output signal representative of the sum of the tare weight of the vehicle and the detected amount of load on the vehicle.

As will have been understood from the foregoing description, the rear road wheels are steered to turn through angles determined in such a manner as to eliminate the lateral slip of the vehicle through detection of the vehicle speed, the sprung masses carried by the front and rear road wheels and the angle through which the front road wheels are steered. Since the sidewise slip of the vehicle making a turn in thus eliminated, the vehicle is capable of travelling correctly in a direction tangential to the turning circle of the vehicle and thus enables the vehicle driver to exactly forecast the direction in which the vehicle being steered by the driver is to advance. Because, furthermore, of the fact that the lateral acceleration of the vehicle making a turn conforms to the acceleration of centrifugal force acting on the vehicle about the center of rotation of the vehicle, the vehicle driver is enabled to steer the vehicle with an unstrained feeling.

As will be understood from each of Equations 2, 2' and 2" and graphically from the curve F of FIG. 4, the rear/front steering-angle ratio k determined in accordance with the present invention assumes a positive value and as a consequence the rear road wheels are steered in opposite directions to the front road wheels when the vehicle is running at low speeds. The vehicle thus therefore be steered to make a sharp turn at low speeds.

Another advantage achievable in the present invention is that the frequency response characteristic of the yawing rate of a vehicle making a turn has a small delay of phase.

While it has been assumed that a method according to the present invention is carried out in an automotive vehicle having a pair of steerable front road wheels to be steered by human intervention and a pair of rear road wheels to be steered in response to a steering effor applied to the front road wheels, this is simply by way of example and, thus, a method according to the present invention may be put into practice in any other wheeled vehicle having at least two pairs of steerable road wheels.

What is claimed is:

1. A method of steering a wheeled vehicle having a first pair of steerable road wheels to be steered by human intervention, a second pair of steerable road wheels to be steered in response to a steering effort applied to the first pair of steerable road wheels, a first wheel axle operatively connected to the first steerable road wheels, a second wheel axle operatively connected to the second steerable road wheels, a hydraulic drive system which is adapted to develop a fluid pressure variable with a control signal applied thereto and which is operatively connected to the second pair of steerable road wheels for driving the second pair of steerable road wheels to veer through an angle variable with the fluid pressure, and means having registered therein values respectively representative of the total sprung mass and the wheel base of the vehicle and the cornering powers of the tires of the first and second steerable road wheels, comprising the steps of detecting the vehicle speed;
  producing a first signal representative of the detected vehicle speed;
  detecting the sprung mass carried by each of the first steerable road wheels and producing a second signal representative of the detected sprung mass of each of the first steerable road wheels;
  determining the distance between the center of gravity of the vehicle and the center axis of said first wheel axle on the basis of the second signal;
  producing a third signal representative of the distance thus determined;
  detecting the sprung mass carried by each of the second steerable road wheels and producing a fourth signal representative of the detected sprung mass of each of the second steerable road wheels;
  determining the distance between the center of gravity of the vehicle and the center axis of said second wheel axle on the basis of the fourth signal;
  producing a fifth signal representative of the distance thus determined;
  calculating the ratio k between the angle through which the second pair of steerable road wheels is to be steered to the angle through which the first pair of steerable road wheels is steered,
  producing a sixth signal representative of the ratio k thus calculated; and
  applying the sixth signal to said hydraulic drive system as said control signal for controlling said fluid pressure on the basis of said sixth signal,
  said ratio k being calculated on the basis of the first, third, and fifth signals in accordance with the equation $$k = \frac{b \cdot l - M \cdot V^2 (a/C_r)}{a \cdot l + M \cdot V^2 (b/C_f)}$$

wherein M is the total sprung mass of the vehicle as registered in said means, V is the vehicle speed represented by said first signal, a is the distance represented by said third signal, b is the distance represented by said fifth signal, $C_f$ is the cornering power of the tire of each of said first steerable road wheels as registered in said means, $C_r$ is the cornering power of the tire of each of said second steerable road sheels as registered in said means, and l is the wheel base of the vehicle as registered in said means.

2. A control device for controlling a steering system of a wheeled vehicle having a first pair of steerable road wheels to be steered by human intervention, a second pair of steerable road wheels to be steered in response to a steering effort applied to the first pair of steerable road wheels, a first wheel axle operatively connected to the first steerable road wheels, and a second wheel axle operatively connected to the second steerable road wheels, comprising:

a hydraulic drive system which is adapted to develop a fluid pressure variable with a control signal applied thereto and which is operatively connected to the second pair of steerable road wheels for driving the second pair of steerable road wheels to veer through an angle variable with the fluid pressure,
  first means having registered therein values respectively representative of the total sprung mass and the wheel base of the vehicle and the cornering powers of the tires of the first and second steerable road wheels;
  second means operative to detect the vehicle speed and to produce an output signal representative of the detected vehicle speed;
  third means operative to detect the sprung mass carried by each of the first steerable road wheels and to produce a second signal representative of the detected sprung mass of each of the first steerable road wheels;
  fourth means operative to determine the distance between the center of gravity of the vehicle and the center axis of said first wheel axle on the basis of the output signal from the third means and to produce an output signal representative of the distance thus determined;
  fifth means operative to detect the sprung mass carried by each of the second steerable road wheels and to produce an output signal representative of the detected sprung mass of each of the second steerable road wheels;
  sixth means operative to determine the distance between the center of gravity of the vehicle and the center axis of said first wheel axle on the basis of the output signal from the fifth means and to produce an output signal representative of the distance thus determined; and
  seventh means responsive to the respective output signals from the second, fourth, and sixth means for calculating the ratio k between the angle through which the second pair of steerable road wheels is to be steered versus the angle through which the first pair of steerable road wheels is steered, producing an output signal representative of the ratio k thus calculated and supplying the last named signal to said hydraulic drive system as said control signal, the seventh means being operative to calculate said ratio k on the basis of said respective output signals and said values registered in said first means in accordance with the equation $$k = \frac{b \cdot l - M \cdot V^2 (a/C_r)}{a \cdot l + M \cdot V^2 (b/C_f)}$$

wherein M is the total sprung mass of the vehicle as registered in said means, V is the vehicle speed represented by the output signal from said second means, a is the distance represented by the output signal from said fourth means, b is the distance represented by the output signal from said sixth means, $C_f$ is the cornering power of the tire of each of said first steerable road wheels as registered in said means, $C_r$ is the cornering power of the tire of each of said second steerable road wheels as registered in said first means, and l is the wheel base of the vehicle as registered in said first means.

* * * * *